United States Patent [19]

Terhune et al.

[11] 4,455,761
[45] Jun. 26, 1984

[54] PNEUMATIC POLYMER EDUCTOR CONVEYOR DRYER

[76] Inventors: Robert D. Terhune; George L. Bazin, II; James H. Long; Linh V. Nguyen, all of c/o Phillips Petroleum Company, Bartlesville, Okla. 74004

[21] Appl. No.: 320,820
[22] Filed: Nov. 12, 1981
[51] Int. Cl.³ .............................................. F26B 5/14
[52] U.S. Cl. ........................................ 34/14; 34/70; 264/141; 264/143; 425/4 C; 425/197; 425/201; 528/502
[58] Field of Search ................ 34/14, 57 R, 57 E, 70, 34/84, 166, 179, 181; 264/141, 143; 425/4 C, 201, 197; 528/502

[56] References Cited

U.S. PATENT DOCUMENTS

| 1,869,703 | 8/1932 | MacLachlan | 159/4 E |
| 3,315,806 | 4/1967 | Sigwart et al. | 34/10 |
| 3,778,907 | 12/1973 | Kuntz et al. | 34/57 R |
| 3,826,208 | 7/1974 | Williams | 110/220 |
| 3,920,362 | 11/1975 | Bradt | 264/164 |

Primary Examiner—Larry I. Schwartz
Assistant Examiner—David W. Westphal

[57] ABSTRACT

A water-wet polymer is extruded through a die plate. Free water formed by extruding action at the die plate is atomized and/or evaporated into an air stream. The die plate assembly discharges the rubber/moisture into a closely adjacent cone/funnel-receiver openly surrounding the die plate, and connecting to and discharging into a lesser diameter conveying tube. The die plate and surrounding funnel are enclosed by a chamber so that air, input tangentially into the enclosure, provides a swirling vortex air flow at the die plate assisting in severing and stripping rubber particles from the die plate.

28 Claims, 6 Drawing Figures

PNEUMATIC POLYMER EDUCTOR CONVEYOR DRYER

FIELD OF THE INVENTION

The invention relates to the drying of polymeric materials. In one aspect, the invention pertains to an apparatus effective for drying water-moist polymeric particles.

BACKGROUND OF THE INVENTION

In the production of rubbery materials by polymerization of one or more polymerizable monomers in a non-aqueous solvent with organometal initiators, the resulting product is obtained as a solution or suspension of rubber in the non-aqueous solvent, usually a rubber-in-hydrocarbon solvent solution termed a cement. Subsequently, the polymeric material must be recovered (separated) from the non-aqueous solvent. For this purpose, treatment of the cement with water has been convenient, usually by steam-stripping which has been most widely used on a commercial basis. Steam-stripping, usually assisted by one or more crumb-forming additives, removes the nonaqueous solvent or solvents and leaves a polymeric product in the form of a crumb as a slurry in water.

A similar net effect is involved in emulsion polymerizations, in that the product is a finely divided slurry of polymeric product in water.

Much of the water can be removed by filtration, pressing, or the like.

The product at this stage contains considerable percentages of water. If derived from a non-aqueous solvent polymerization system, a few percent of volatile and off times potentially flammable solvent still may remain associated with the polymeric/rubbery particles.

Various methods have been utilized in efforts to remove the final few percent of water, and, where present, the final few percent of remaining non-aqueous solvent.

One of the most common commercial methods employed is the so-called expansion process. In this process, the moist material is compressed in an extruder, such as a worm extruder which heats the material by work and friction, optionally with a supplementary supply of heat if desired, and is extruded through nozzles of relatively small diameter. The reduction in pressure which occurs on the discharge side of the die plate assists in evaporation of the moisture/solvent present.

Unfortunately, the normal collection method on the discharge side of the die plate has been to discharge the particles or strands into a relatively large receiving chamber or "hot box" which usually has a conveyor to remove the dry material. While various configurations have been tried, none have been particularly effective. The reason for this is that as the rubber or polymeric particles, crumbs, or strands, are sprayed out, impinging on the top and sides of the hot box, a buildup of polymer occurs on the surfaces of the chamber or hot box, usually on the upper portions of the sides and on the top of the hot box or expansion chamber. Being cooler, these surfaces, tend also to accumulate various proportions of moisture. The build-up of material lags in the chamber and tends to "age", resulting in degradative effects, or formation of gel from age, heat, and moisture. Periodically, various chunks of such materials fall back into the box and become associated with the fresh rubber or polymeric particles. These chunks of material, more or less moist, and of differing physical properties from the fresh product, may fall down onto the conveyor in the bottom of the "hot box", and ultimately be included in the pressed bales of products. As much as 5 to 10 percent by weight of the bale may be such undesirable product. This frequently requires either physical separation, or product rejection, resulting in increased costs to produce products without said undesirables in it.

Further, the accumulation on the surfaces of the "hot box" require periodic shutdown of the entire production train, and frequent manual cleaning. This in itself not only is a chore, but results in "track-in" of undesirable materials, grit, sand, and the like, from the outside as a consequence of the cleaning operation, and thus further contamination of the ultimate baled product.

Another problem has been with spontaneous fires due to flaming of the hydrocarbon solvent traces, resulting in overheating and fire hazards.

In spite of many difficulties, expansion drying has had advantages over other methods of drying, primarily being low cost of plant and operating costs. Nevertheless, distinct improvements are and have been needed.

SUMMARY OF THE INVENTION

In our pneumatic polymer eductor conveyor dryer, a water-wet polymer from a product recovery operation is extruded through a die plate. Free water removed by the extruding action of the die plate is atomized and/or evaporated into a flowing air stream. The flow rate is controlled to preferably avoid explosive expulsion. The die plate assembly discharges the rubber/moisture into a receiver which is a closely adjacent funnel receiver spaced away from but openly surrounding the die plate, and connecting to and discharging into a lesser diameter conveying tube. The latter in turn can dump into a conventional hot box, or preferably conveying to a cyclone accumulator. The die plate and surrounding funnel are totally enclosed by a chamber, so that air, which can be heated and/or cooled and/or humidified or dehumidified as needed, is input thereto tangentially. The tangential input of the air flow is preferably and normally behind the funnel receiver, away from the die plate, toward the rear of the enclosure. The tangentially input resulting air flow creates a vortex action at the die plate, and provides a relatively high velocity flow in the narrow spacing between the edge of the plate and the closely adjacent edge of the receiver funnel, thus assisting in a pulling and stripping action of rubber particles from the die plate, effectively a swirling shearing action, maintaining a clean die plate, and in turn conveying the dry rubbery particles into the conveying tube and through the conveying tube into the recovery unit.

The net result is effective recovery, virtually no degradation of rubber; no accumulation of product on the die plate or in the cone or conveying tube; a dry product; and no fire hazards. By our invention, the old "hot box" can still be used but is much improved, substantially being eliminated are the accumulation of rubber mats or pads on the surfaces and ceiling thereof. Alternatively, and preferably, our inventive receiver apparatus permits elimination of the hot box, and recovery of the well-dried product in a cyclone.

DETAILED DESCRIPTION OF THE INVENTION

Figure 1:
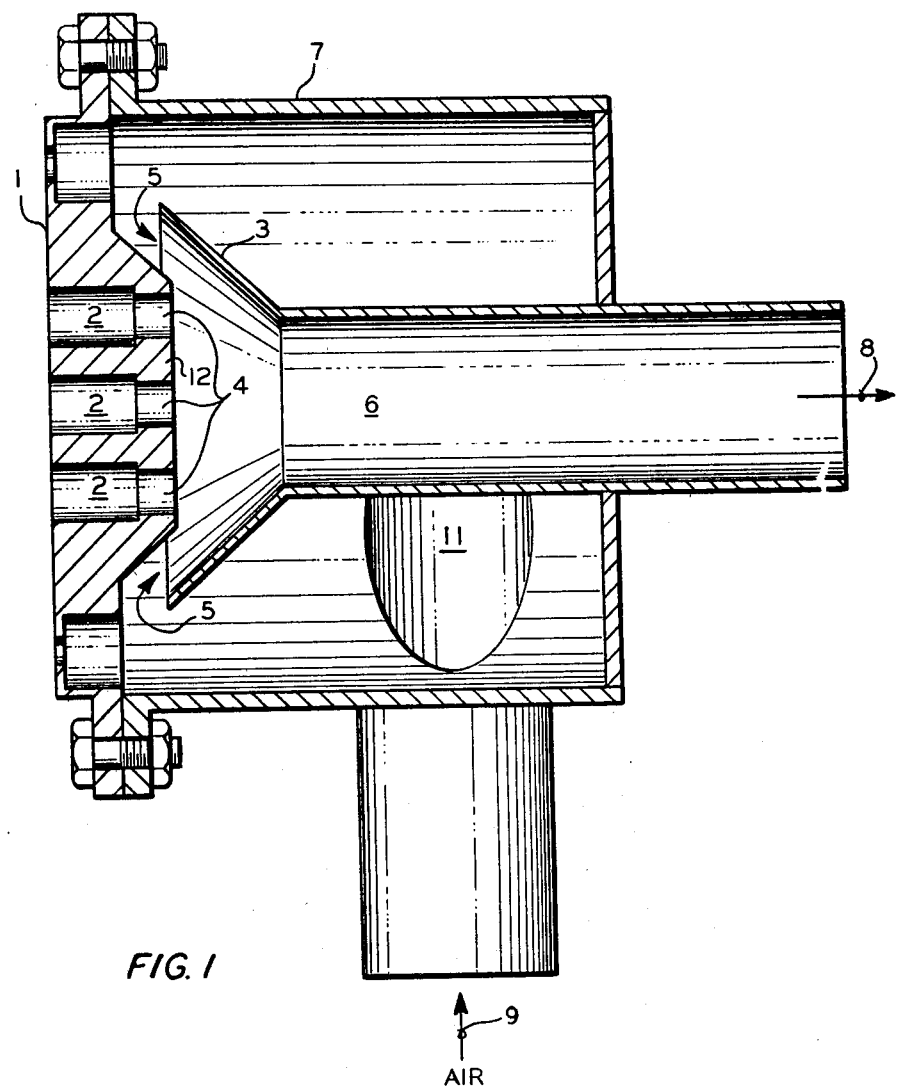
FIG. 1 shows the basic heart of our invention by a longitudinal section view through the enclosed receiver. The die plate 1 receives wet rubber from an extruder (not shown) and extrudes the wet rubber through various orifices 2 of the die plate 1. These orifices discharge the rubber particles into a funnel receiver 3 which is spaced away from the discharge end of the die plate 4 (exterior end of the orifices), but openly surrounds them 5. The funnel 3 collects the particles by means of an air flow, and the particles then are conveyed on down the conveying tube 6. It is seen that the orifice discharge and funnel are completely enclosed by a box 7 so as to make a closed chamber, closed except for die holes 4, the discharge 8 for the air/rubber particles, and of course for the air inlet 9. The air inlet 9 is shown 11, entering in a tangential fashion into the surrounding chamber 7, which creates then a swirling or shearing vortex action at the die plate face 12, as the air pours in around and through the funnel receiver 3, tearing the rubber particles and conveying them at the same time through the receiver and down through the conveying tube.

Rubber/water admixtures received from such as an emulsion polymerization process, or steam stripping of a non-aqueous polymerization process, may contain varying quantities of water. Usually, the water content is mechanically reduced by squeezing, filtration, pressing, and the like, to such as between 6 and 15 weight percent. The remaining water then is evaporated in an expansion process.

In the expansion process, the moist material is raised to a pressure of such as 34 to 82 atmospheres gauge, preferably 50 to 70 atm., and a temperature of such as 120° to 230° C., preferably 148° to 204° C., and extruded through narrow nozzles with simultaneous releases of pressure. As the pressure is released, due to the change in pressure and change in temperature induced by the heating caused by the extrusion process, the moisture tends to evaporate. Preferred is control so that a non-explosive evaporation is involved but with sufficient expansion to avoid formation of strands. This extrusion/heating/discharge process not only removes moisture, but also removes any remaining non-aqueous volatiles.

The resulting rubber is thus broken down into small, open-celled spongy lumps, and tends to be cooled to such as 100° C. by the evaporating water. Depending on the rubber, of course, particles may be produced, or sometimes long strings.

In our invention, a pneumatic polymer eductor conveyor dryer is provided. A water-wet polymer from a polymer recovery operation is received. The water-wet polymer is put through an extruder and extruded through a die plate. The die plate as to the size of orifices, configuration thereof, number thereof, can be varied by one skilled in the art depending on the type of rubber, amount of moisture, and the like. Usually, in the extruder, the effect of working and compression increases the temperature of the rubber. This can be controlled by the usual means of cooling the extruder, and/or controlling the flow of rubber, to avoid overheating.

Upon discharge of the rubber from the orifices, free water is removed by the extruding action at the die plate, is atomized and/or evaporated into an air stream. Discharge from the orifices is into a closed chamber. The closed chamber is equipped with an air input which normally is to the rear of the chamber and is in a tangential position relative to the chamber and orifice. Immediately adjacent to, spaced away from, but openly surrounding the die plate, is a funnel of cone or conoid type and of preferably truncated construction such that the vertex of the cone or conoid has been removed. The vertex usually is removed at a flat perpendicular plane to the cone, but could be removed, if desired, on a slanted intersecting plane forming an elipsoid. At the resulting plane is connected a conveying tube of somewhat lesser diameter than the base or open end of the cone or conoid. The open end of the funnel, the large end, openly but closely surrounds the die plate, receives the rubber particles and air, and conveys them then by closed connection into the discharge tube. It is important to note that the closed chamber with tangential air input provides an effective swirling shearing action at the die plate assembly, effectively shearing and clearing the rubber particles as they are extruded, either as particles or spaghetti strands, keeping the die plate clean, the receiving funnel clean, and the conveying tube clean.

Figure 2:
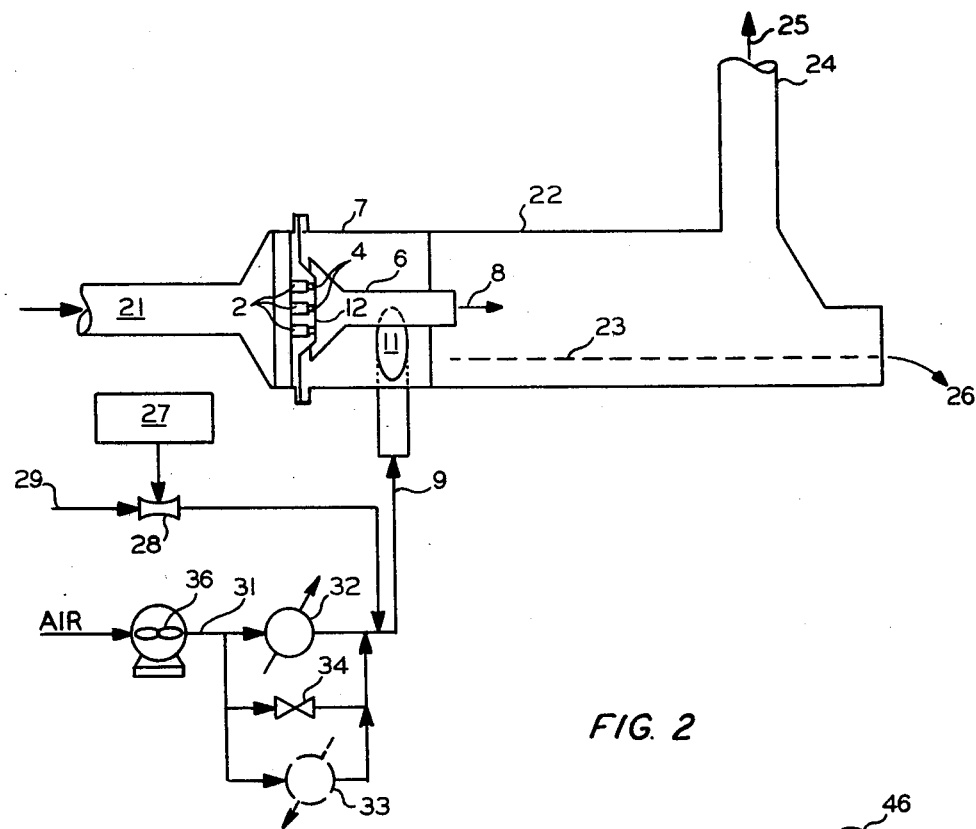
FIG. 2 shows our novel chamber coupled with a hot box. The same indicator numbers as in FIG. 1 are employed for similar components. Shown in FIG. 2 is an option that can be employed in any of the configurations of our apparatus: the extruder 21 brings rubber to the die plate 1. The die plate 1 extrudes rubber through orifices 2, 4 into the funnel collector 3, shown with our complete enclosure 7, air input 9. Rubber particles in the air stream discharging in this configuration into the hot box fall onto the conveyor 23 for ultimate removal 26 and recovery such as baling (not shown). Shown is an option 27 by which an additive, such as a talcum powder, can be fed by an aspirator arrangement 28, and admixed with forced air 29, for flow into the air inlet 9. Optionally, a portion of the primary air 31 provided by air pump 36 can be heated 32, or cooled 33, or both together, with a tempering device 34, or humidified.
Figure 3:
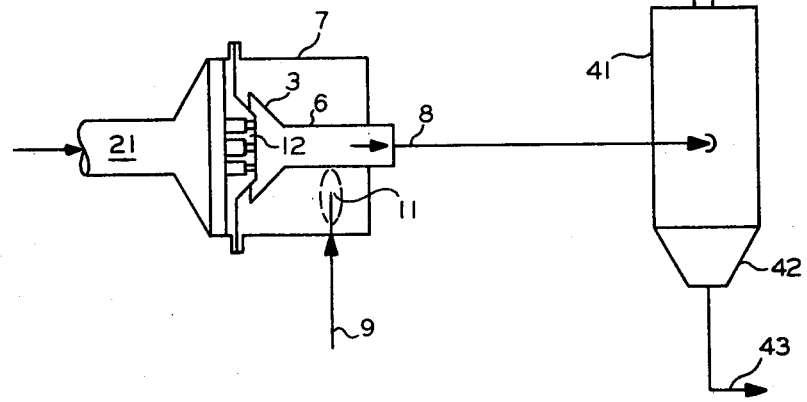
FIG. 3 shows essentials as described with FIG. 1, except conveying 8 the dry rubber particles by means of the air stream into a receiving cyclone 41 which accumulates the dried rubber in the bottom hopper 42 for removal 43, and the air then is discharged 44 and removed 45, optionally with auxiliary exhaust blower 46.
Figure 4:
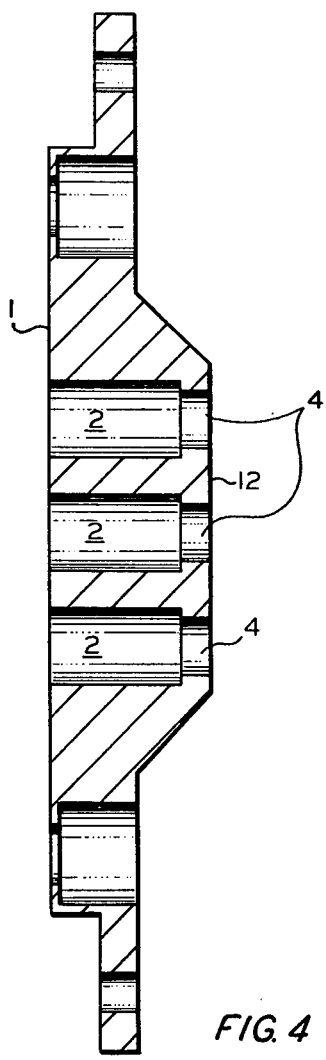
FIG. 4 shows a typical die plate 12 itself. Orifices 2, 4 can be of variable diameter and configuration, need not be of the reduced diameter shown, and can be a nozzle or cone configuration as may be desired.
Figure 5:
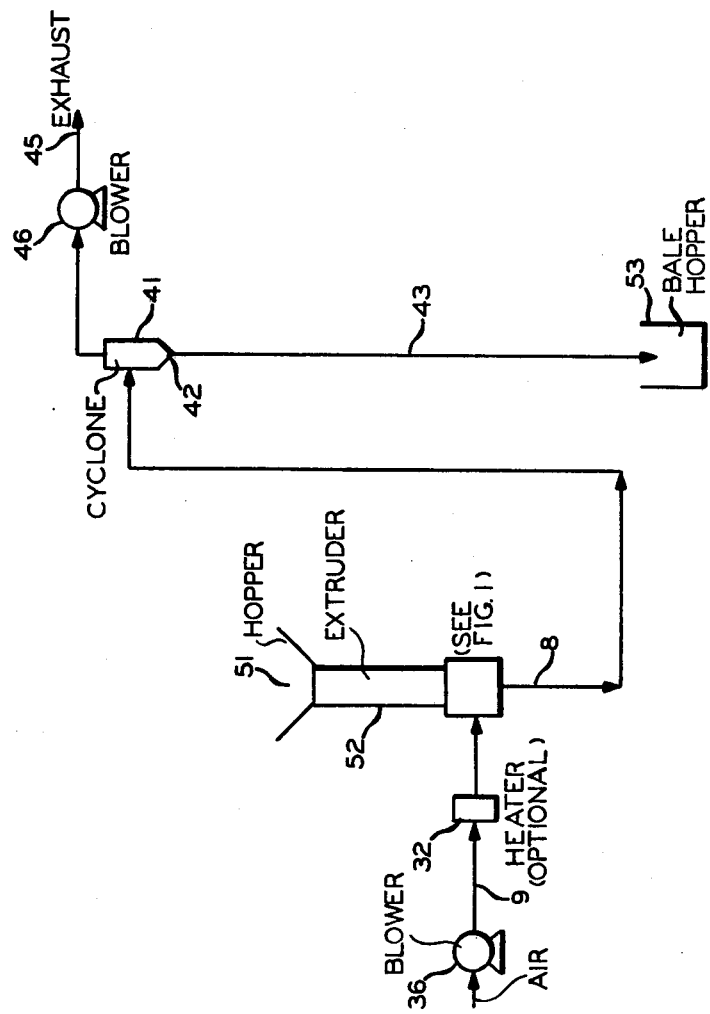
FIG. 5 shows an overall arrangement including a hopper feed 51, an extruder 52 discharging into the apparatus of our invention, supplied with air, optionally heated 32, as described above. Here the process sequence conveys 8 the dried rubber to the described cyclone 41. The cyclone 41 accumulates the dried particles 42 which are then discharged periodically 43 into a bale hopper 53, box, or other packaging device.
Figure 6:
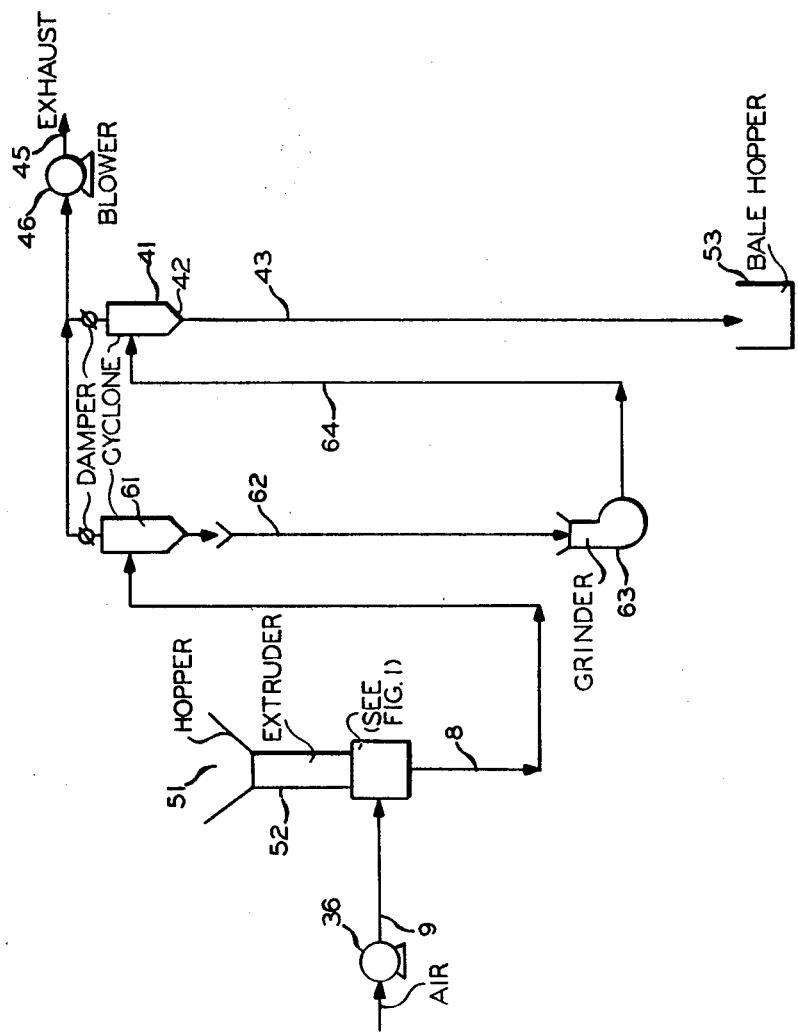
In FIG. 6 an alternate, but presently preferred sequence, is shown. An intervening first cyclone 61 is employed to collect the rubber particles, which are then removed periodically or continuously 62 and reground 63, and conveyed 64 by air flow into the collector cyclone 41, which accumulates the rubber particles 42 for periodic discharge 43 to a bale hopper 53 or packaging device. This method provides more uniform control of particle size.

The tube then can discharge into a conventional hot box as shown in FIG. 2, or preferably convey into a receiving cyclone as shown in FIGS. 3, 5, and 6.

The die plate and surrounding cone are totally enclosed by a chamber into which air is input, preferably at low pressure of such as about 2 to 4 psig, and importantly is input tangentially into the chamber in an area spaced away from the die plate and cone.

The tangential air flow rate depends on the characteristics of the rubber, its water content, the temperature of the extruded rubber, the temperature and humidity of the air, desired final water (moisture) content of the rubber and relative size of extruder and chamber, and can be readily determined. Air flows of 100 to 100,000 cu. ft./min. may be involved, more usually 1,000 to 10,000 cu. ft. per minute, at ambient or less to 200° F., more usually ambient to 175° F.

The tangential air inlet into the enclosed chamber provides a vortex action at the extruder nozzle, producing a spiral flow as the air passes into the narrow space formed by the open end of the cone surrounding the die plate assembly, a spiral flow as the air passes across the die plate, into the cone and into the conveying tube. In our observation, the swirling or vortex action of the air flow at the die plate assists in pulling or stripping rubber crumbs or strands from the die plate face, as well as providing the necessary air to evaporate the moisture, and to convey the "dry rubber" either into a conventional but now useful hot box, or preferably and desirably into a cyclone receiver. It is to be noted that the orifices, the surrounding but spaced open end of the truncated funnel, and the receiving tube sealably connected to the plane of the truncated cone, all are axially aligned. Once past the enclosure or enclosed chamber in accordance with our invention, the conveying tube can be handled as may be desired or convenient for various plant configurations, such as shown in FIGS. 2, 3, 5, and 6. Discharge can be into a conventional hot box, in which the rubbery particles are blown into and fall onto a conveyor as shown by the dotted line. Discharge can be shown schematically into a cyclone as shown in FIG. 3, or, into a cyclone as shown in FIG. 5, or into a series of cyclones, preferably with intervening grinder, as shown in FIG. 6.

Polymers

The polymers to be treated usually are rubbery polymers prepared by polymerizing one or more conjugated diene monomers alone, or in admixture with, or sequentially with one or more active $CH_2=C<$ group which are copolymerizable therewith. Suitable comonomers containing this group $CH_2=C<$ include the monovinylarenes as described hereinafter, as well as acrylonitrile, methyl acrylate, methyl methacrylate, vinyl chloride, methyl vinyl ether, ethylene, propylene, 1-butene, 1-propene, 1-octene, and the like. Generally at least 50 weight percent conjugated diene is used in the monomer mixture when copolymers are prepared in order to prepare the preferred rubbery copolymers to which our invention is most applicable.

The polymers to which the steam stripping process of our invention can be applied also include the hydroxyl, carboxyl, mercapto, and amino-containing derivatives of the conjugated diene polymers described.

The polymer cements are prepared by polymerizing the monomers in an organic solvent selected from paraffins, cycloparaffins, and aromatic hydrocarbons, which is relatively inert, non-deleterious, and liquid under the conditions of the polymerization process. Examples include the lower molecular weight alkanes such as propane, butane, pentane, hexane, heptane, and isooctane; cycloparaffins such as cyclohexane; and methylcyclohexane; and aromatic compounds such as benzene and toluene; and the like.

A variety of initiator systems are suitable for the solution polymerization process production of the polymers.

One useful type of initiator system is a two or more component system wherein one component is an organometal compound of the metals of Groups I, II, and III, including those where one or more but not all of the organo is replaced by a halogen, a metal hydride, or a metal of Group I, II or III, and the second component is a Group IV to VI compound, e.g., salt or alcoholate. This type of initiator system is fully described with examples in columns 5 and 8 of U.S. Pat. No. 2,886,561, dated May 12, 1959.

Another type of suitable initiator system are the organolithium compounds $R^2(Li)_x$ as described hereinafter for preparing the lactone copolymers. The amount of organolithium initiator used to prepare the conjugated dienes polymers can vary over a broad range, but in general is in the range of about 0.1 to 100, preferably about 0.25 to 2, gram milliequivalents of lithium per 100 parts by weight of total monomers charged. Of course, organoalkali metal compounds of other Group Ia metals can be used as is known in the art.

Another initiator system utilizes a cobalt compound and a metal alkyl of the Group III metals as exemplified by aluminum wherein one but not all of the alkyl groups can be replaced by halogen. Examples of these organometal compounds include trialkyl aluminums such as triethylaluminum and triisobutylaluminum, and alkyl aluminum halides such as ethylaluminum dichloride and diethylaluminum chloride. For the cobalt compound, the cobaltous form is preferred, including such as cobaltous chloride, cobaltous sulfate, and cobaltous nitrate, and the salts of organic acids such as cobaltous acetate.

Conjugated dienes containing such as 4 to 12 carbon atoms per molecule, optionally with the monovinylarenes containing such as 8 to 12 carbon atoms per molecule, can be used.

Suitable conjugated dienes include 1,3-butadiene, isoprene, piperylene, 1,3-hexadiene, 1,3-octadiene, 6-phenyl-1,3-hexadiene, and mixtures. Suitable monovinylarenes include styrene, α-methylstyrene, 4-methylstyrene, 4-isopropylstyrene, 2,4-dimethylstyrene, 1-vinylnaphthalene, 2-vinylnaphthalene, and mixtures.

Polymerization temperatures, times, and the like, do not form a part of our invention, since these are known and are within the skill of one skilled in the art. The polymers can be linear, branched, random or block, coupled or uncoupled, and of mixed type; and can be terminated by groups such as carboxy, etc.; all as known in the art.

In emulsion polymerizations, the usual conditions can be employed, using various types of free radical polymerization initiators, and the like, all as well known in the art.

Those products produced as a slurry, can then be recovered as discussed hereinbefore by filtration, pressing, and the like. Those produced as a solvent or slurry in hydrocarbon or other non-aqueous solvent can be recovered by such as steam stripping, and the resulting particles then recovered by pressing, filtration, or the like. The resulting material is a water-wet material, which may contain various amounts of potentially hazardous hydrocarbon, and is the subject for recovery then in a dry condition free of moisture and/or hydrocarbon solvent in accordance with the apparatus of our invention.

EXAMPLES

The following examples record runs/data from our development of the pneumatic polymer eductor conveyor dryer in accordance with our invention. Particular materials employed, amounts, relationships, and the like, are intended to be exemplary and not limitative of our invention.

EXAMPLE 1

A carboxy terminated linear block 85/15 butadiene/styrene copolymer, was first dried with the PEC system illustrated in FIG. 5. Conditions required to produce dry polymer were readily attained. Various dies were tested in the expander die plate in an attempt to produce a polymer suitable for marketing as crumb without success. The product form was suitable for baling, but the strands were too long and irregular for marketing as crumb. The product from the collecting cyclone was too hot for baling indicating the need for an additional cooling step. The run was continued for 12 hours to demonstrate system reliability without any significant build-up of rubber in the conveying equipment. Data for Test 1 is shown in Table I:

other runs, indicated that the air preheater was not necessary.

EXAMPLE 2

A linear block 70/30 butadiene/styrene copolymer of about 160,000 $M_w$ (wt. avg. mol. wt.) (Solprene ® 308 from Phillips Petroleum Co.) was successfully dried with the PEC system illustrated in FIG. 5. The expander die plate was fitted with one 7-hole die (9/64-inch holes). The PEC device produced a fragile rice-like material with some fines. The PEC system handled the fines without the problems associated with the conventional hot box system. The system was operated for about 7 hours with no serious build-up of polymer in the conveying system.

EXAMPLE 3

A linear block 75/25 butadiene/styrene copolymer with about 83,000 $M_w$ (wt. avg. mol. wt.) (Solprene 1205 from Phillips Petroleum Co.) was first dried with the PEC system illustrated in FIG. 5. Several die configurations were tested in an attempt to yield product that would be satisfactory to package as crumb. Two 37-hole dies (1/16-inch holes) produced strands up to 12 inches long and appeared to have too much open area for Solprene 1205. Product moisture was about 1.0 percent. Four 1-holes dies (3/16-inch holes) also produced long strands at 0.5 to 1.0 percent moisture. Use of two 1-hole dies (3/32-inch holes) over-dried the polymer and produced a mixture of fine, crumb, and strands. Three 1-hole dies (3/32-inch holes) gave dry polymer and 2 to 3 inch strands. The PEC satisfactorily con-

TABLE I

PRODUCT EDUCTOR CONVEYOR
Test 1

| Expander | | | Rate | Dies | | Volatiles, | |
|---|---|---|---|---|---|---|---|
| Amps | RPM | Temp. °F.* | #/hr | No. | Size | % | Product Form |
| 34 | 166 | 340 | 310 | 3 | 37h(1/16″) | 1.3 | Strands |
| 30 | 220 | 380 | 305 | 3 | 37h(1/16″) | 0.25 | Strands |
| 38 | 150 | 358 | — | 2 | 37h(1/16″) | 1.5 | Strands |
| 40 | 150 | 350 | — | 2 | 37h(1/16″) | 0.90 | Strands |
| 44 | 150 | 370 | 300 | 2 | 12h(3/32″) | 0.20 | Strands |
| 35 | 160 | 345 | 337 | 5 | 1h(3/16″) | 0.30 | Strands |
| 37 | 172 | 348 | — | 5 | 1h(3/16″) | 0.17 | Strands |
| 50 | 150 | 345 | 400 | 5 | 1h(3/16″) | 0.50 | Strands |

*At last breaker bolt

The above runs were made with equipment arrangement as shown in FIG. 5, which consisted basically of a positive displacement blower, air preheater, our PEC, a cyclone, and a cyclone balancing blower. The system is satisfactory for polymers that fragmented easily at the die plate, but tended to leave some polymers in strands of varying length. The system satisfactorily conveyed all forms of material: fines, crumb, and long strands. These results obtained in the above runs, as well as veyed all of these polymer forms. The failure of Solprene 1205 to fragment into crumb at the die plate is probably due to the characteristics of the Pilot Plant expeller-expander system. Moisture in the expeller discharge is not high enough to give much blasting at the expander die plate. A total of 2000 pounds of polymer was dried during this test with no appreciable build-up of polymer in the conveying system. Data for the first Solprene 1205 test is shown in Table II:

TABLE II

PRODUCT EDUCTOR CONVEYOR
Solprene 1205 - Test 1

| Expander | | | Rate | Dies | | Volatiles, | |
|---|---|---|---|---|---|---|---|
| Amps | RPM | Temp. °F.* | #/hr | No. | Size | % | Product Form |
| 50 | 140 | 320 | 320 | 2 | 37h(1/16″) | 1.9 | Strands |
| 32 | 185 | 345 | 310 | 2 | 37h(1/16″) | 0.9 | Strands |
| 32 | 185 | 325 | 290 | 4 | 1h(3/16″) | 1.0 | Strands |
| 30 | 243 | 345 | 305 | 4 | 1h(3/16″) | 0.5 | Strands |
| 43 | 125 | 365 | 300 | 2 | 1h(3/32″) | 0.5 | Strands |
| 50 | 135 | 355 | 340 | 2 | 1h(3/32″) | 0.1 | Fines, Crumb & Strands |
| 46 | 105 | 350 | 300 | 3 | 1h(3/32″) | 0.3 | Strands |

TABLE II-continued

PRODUCT EDUCTOR CONVEYOR
Solprene 1205 - Test 1

| Expander | | | Rate | Dies | | Volatiles, | |
|---|---|---|---|---|---|---|---|
| Amps | RPM | Temp. °F.* | #/hr | No. | Size | % | Product Form |
| 48 | 110 | 355 | 325 | 3 | 1h(3/32") | 0.3 | Strands |

*At last breaker bolt

EXAMPLE 4

The PEC system was revised to eliminate the air preheater and incorporate a Wedco UT-18 mill and an additional cyclone as illustrated in FIG. 6. The Wedco screen, cutting blocks, and speed can be varied to give the desired polymer size reduction. This system allowed for a complete change of air between the PEC device and the final product discharge, thus aiding in drying and cooling the polymer.

A second test using the same type of copolymer as described in Example I was made after the Wedco mill and the second cyclone were added to the PEC system as shown in FIG. 6. The expander die plate contained two 37-hole (1/16-inch holes) dies. The Wedco mill contained a screen with ¼-inch holes, ⅜-inch cutting blocks with ¼-inch clearance, and was operated at 3200 RPM. Strands of varying lengths (½ to 5 inches) were produced at the die plate. The strands were conveyed without difficulty to the Wedco mill where they were reduced to a rice-like form which was ideal for packaging as crumb. Moisture contents of the material from the first cyclone to the Wedco mill and from the second cyclone were both about 1 percent. Data for Test 2 is shown in Table III:

TABLE III

PRODUCT EDUCTOR CONVEYOR
Solprene 312 - Test 2

| Expander | | | Rate | Dies | | Volatiles, % | | | Product |
|---|---|---|---|---|---|---|---|---|---|
| Amps | RPM | Temp. °F.* | #/hr | No. | Size | From Expeller | From Expander | Final | Form |
| 54 | 120 | 365 | 280 | 2 | 37h(1/16") | 6.9 | 0.9 | 0.9 | Crumb |
| 50 | 120 | 360 | — | 2 | 37h(1/16") | 6.7 | 1.1 | 1.1 | Crumb |
| 40 | 165 | 375 | 300 | 2 | 37h(1/16") | — | 1.1 | 1.0 | Crumb |

*At last breaker bolt

Following this test the transport line from the first cyclone to the Wedco mill was revised to allow a more complete exchange of air. This allowed the system to dry the rubber to less than 0.5 percent moisture. Later tests demonstrated that Solprene 1205 could be dried to a very low moisture content with the revised system.

EXAMPLE 5

A second Solprene 1205 test was made after the Wedco mill and the second cyclone were added to the PEC system as shown in FIG. 6. The expander die plate contained three one-hole dies (3/32-inch holes) and the Wedco mill was fitted with a ⅜-inch screen, ¼-inch cutting blocks with ¼-inch clearance, and was operated at 2000 RPM. The polymer was dry almost immediately after a successful start-up and the product form appeared satisfactory for packaging as crumb. The dryer line was operated for 5½ hours to produce 1620 pounds of crumb, packaged in BC-4 boxes for sampling. During the 5½ hour run dryer conditions were varied slightly to increase the amount of volatiles from a very low level to a level near the top of the moisture specification. Data at the higher volatile levels indicated that additional drying was occurring as the polymer passed through the Wedco mill and the second cyclone. Data for the second Solprene 1205 test is shown in Table IV:

TABLE IV

PRODUCT EDUCTOR CONVEYOR
Solprene 1205 - Test 2
(3-1 hole (3/32-inch holes))

| Expander | | | Rate | Volatiles, % | | | Product Temp. °F. | |
|---|---|---|---|---|---|---|---|---|
| Amps | RPM | Temp. °F.* | #/hr | From Expeller | From Expander | Final | To Mill | Final |
| 42 | 150 | 380 | 310 | — | 0.20 | 0.20 | 167 | 113 |
| 46 | 150 | 353 | 430 | 6.0 | 0.25 | 0.25 | 167 | 122 |
| 50 | 117 | 333 | 372 | 8.0 | 1.25 | 0.90 | 167 | 113 |
| 48 | 140 | 335 | 380 | — | 1.00 | 0.85 | 172 | 117 |

*At last breaker bolt

During the initial start-up the operator had trouble keeping the dies seated in the die plate. This resulted in several false starts. During one of these starts the rubber overheated and the expander discharged a cloud of smoke that quickly dissipated. There were no indications of burned polymer. This has been one of the unexpected advantages of the PEC system. Several times during upset conditions the expander has reached temperatures that would normally result in burning rubber in the hot box, but with the PEC system no burning polymer has been experienced.

It can be readily seen from the data above that a variety of polymers can be processed through the PEC of our invention, to produce low volatile content dry products without gel formation. Our PEC system eliminates the wet spots and gel particles frequently experienced with a conventional extruder hot box system. The incorporation of a Wedco mill in the PEC pneumatic loop provided a means of controlling the form of the final products. Clearly, our PEC system reduces the risk of dryer line fires resulting from overheated polymer.

Another option that we have developed, and illustrated in our attached FIG. 2, is the use of an additive, such as talcum, or the like, or can be other finely divided material such as calcium carbonate, zinc stearate, or the like, which can be blown to treat the rubbery particles. This system also can be utilized to incorporate a variety of other additives into the final polymer, if desired.

Presently preferred is a heated air input would involve about 5000 cubic feet per minute of such as about 146° F., by means of a 6-inch line at a flow velocity of 130 m/sec discharging into our closed blocks employing a 12-inch diameter die plate, with a funnel of about 15.5 inches diameter, openly surrounding the die plate, with a narrow passageway between the cone and the die plate, of about 0.50 inch clearance, producing a velocity at that point estimated at about 195 meters per second, dropping in the cone truncated section to about 65 meters per second, and then increasing again in the discharge line which conveniently can be such as about 6-inches in diameter, to the original velocity of about 130 meters per second. Preferably and conveniently, in the axially aligned receiving tube or pipe, can be inserted vanes in order to, in effect, straighten out the air swirl for more convenient air conveying.

In addition to the runs described above, a variety of other materials have been employed, such as a cis-4-polybutadiene which is a homopolymer of high content cis-butadiene with about 200,000 $M_w$ (weight average molecular weight).

EXAMPLE 6

The PEC (Pneumatic Eductor Conveyor) was used for a series of tests for the drying of Cis-4 ® polybutadiene rubber. The PEC system was as illustrated in FIG. 5, with the talcum eductor of FIG. 2. This PEC system consisted of a positive displacement blower, heat exchanger, air chamber, die plate, cyclone, associated air conveying piping, and a talcum powder eductor and feeder chamber. A series of six tests were made dry Cis-4 polybutadiene. A summary of the tests is as shown in Table V:

TABLE V

PRODUCT EDUCTOR CONVEYOR
Cis-4 Polybutadiene

| Test No. | Length of Run Hours | Die | Major Problem Encountered |
|---|---|---|---|
| 1 | 2 hrs. | 37 - 1/16 inch diameter holes | Cyclone and drop chute plugging |
| 2 | 2 hrs. | 37 - 1/16 inch diameter holes | Erratic expander operation not connected with PEC |
| 3 | 6 hrs. | 37 - 1/16 inch diameter holes | 1/16 inch rubber layer in PEC cyclone |
| 4 | 5 hrs. | 37 - 1/16 inch diameter holes | Gravel plugged die holes not connected with PEC. |
| 5 | 19 hrs. | 7 - 5/32 inch diameter holes | Gravel in die holes plus plug up of PEC cyclone |
| 6 | 9 hrs. | 37 - 1/16 inch then 7 - 5/32 inch diameter holes | Cylone had build up of rubber layer and cyclone plugged |

In spite of problems which required correcting prior to continuing the test runs, a majority of the Cis-4 polybutadiene was dried successfully. However, inspection of the Cis-4 polybutadiene holes after two weeks showed that a portion of the polymer was actually wet with 0.27 to 1.17 weight percent volatiles. A portion of the holes appeared to have very small white spots. These white spots were attributed not to the PEC system but to the weigh scale system that allowed rubber to build up and then drop back into the Cis-4 polybutadiene product during the dumping cycle of the weigh scales. Further design could produce an elimination of the white spots from weigh scale rubber build up.

In summary, the Cis-4 polybutadiene tests of the PEC system were successful in producing dry rubber.

The disclosure, including data, has illustrated the value and effectiveness of our invention. The examples, the knowledge and background of the field of the invention and the general principles of chemistry and of other applicable sciences have formed the bases from which the broad descriptions of our invention including the ranges of conditions and the generic groups of operant components have been developed, and formed the bases for our claims here appended.

We claim:

1. An apparatus for drying water-wet rubbers comprising in cooperative sequential association:

a die plate with an inlet side, a discharge side, and multiple orifices penetrating through said die plate suitable for extruding a wet rubber, funnel receiver means having a large open end and a truncated smaller end, said large open end spaced slightly away from and closely surrounding said die plate discharge side, said truncated small end sealably connected to a funnel discharge means, a closed chamber surrounding said discharge side of said die plate and said receiver means, containing a single outlet opening sealably surrounding said funnel discharge means, and tangentially positioned inlet for air positioned for tangential inlet of said air to said chamber generally parallel to and spaced substantially and away from said die plate face and effective to create an air vortex across said die plate face upon inlet of air stream, and rubber collector means for receiving rubber from said funnel discharge means.

2. The apparatus according to claim 1 further incorporating an additive feeder means suitable for feeding an additive into an air stream prior to said air inlet means.

3. The apparatus according to claim 1 further incorporating means adapted for at least one of heating air, cooling air, and controlling humidity of air employed as an air stream to said air inlet.

4. Apparatus according to claim 1 wherein said funnel discharge means comprises a conveying tube.

5. The apparatus according to claim 4 wherein said collector means comprise a hotbox recovery means.

6. The apparatus according to claim 4 wherein said funnel means is selected from one of a truncated cone and a conoid.

7. The apparatus according to claim 6 wherein said collector means comprise a conveying tube, and a first cyclone recovery means.

8. The apparatus according to claim 7 wherein said collecting means comprise in sequence said first cyclone recovery means, a grinder means, a second cyclone recovery means, and conveying means from said grinder means to said second cyclone means.

9. The apparatus according to any of claims 5, 6, 7, or 8 wherein said air input means permit an air input rate of the order of about 5000 cubic feet per minute at a temperature of about 146° F. by means of a 6-inch inlet line, said die plate employs a 12-inch diameter die plate, said funnel has a diameter of about 15.5 inches, and is openly associated with die plate face permitting about 0.5 inch clearance.

10. A process for drying a water-wet polymer which comprises extruding said water-wet polymer through multiple orifices extending through an extruder die plate means, thereby expanding the extruded wet polymer on a discharge side of the die plate, discharging the extruded rubber and moisture from said die plate means into a closely adjacently positioned open end of a truncated funnel receiver means closely surrounding said die plate means, and sealably connecting at its truncated end with a dried rubber conveying means, said discharge side of said die plate means and funnel receiver means totally enclosed by chamber means, said chamber means having a front portion at the die plate and a rear portion at an opposite end of the chamber therefrom, air inlet means positioned tangentially in said chamber means effective for tangential air inlet and positioned in the rear portion of said chamber means generally parallel to and away from said die plate means and to the rear of said funnel receiver means, supplying air to said air inlet to provide an air stream stripping the expanded wet polymer with said air stream, thereby substantially evaporating said water into said air stream, and stripping said rubber as particles from said die plate into said dried rubber conveying means, thereby resulting in a substantially dried particulate rubber.

11. The process of claim 10 wherein said truncated funnel receiver means is selected from a truncated cone and a truncated conoid.

12. The process according to claim 10 wherein said dried rubber conveying means convey said resulting dried rubber into a hot box recovery means.

13. The process according to claim 10 wherein said dried rubber conveying means convey said resulting dried rubber into a cyclone recovery means.

14. The process according to claim 12 or 13 wherein said air stream is input at a pressure of about 2 to 4 psig.

15. The process according to claim 14 wherein said polymers are solution polymerized conjugated diene polymers selected from homopolymers, or copolymers with monovinylarenes or other $CH_2=<$ group containing comonomer.

16. The process according to claim 15 wherein said rubber is a linear block butadiene/styrene copolymer.

17. The process according to claim 16 wherein said linear block butadiene/styrene copolymer is an 85/15 carboxy terminated copolymer.

18. The process according to claim 17 wherein said air input is at a rate of about 5000 cubic feet per minute at a temperature of about 146° F. by means of a 6-inch inlet line, said die plate employs a 12-inch diameter die plate, said funnel has a diameter of about 15.5 inches, and is openly associated with said die plate face permitting about 0.5 inch clearance.

19. The process according to claim 16 wherein said butadiene/styrene copolymer is a 70/30 copolymer.

20. The process according to claim 17 wherein said rubber is a cis-polybutadiene.

21. The process according to claim 19 wherein said air input is at a rate of about 5000 cubic feet per minute at a temperature of about 146° F. by means of a 6-inch inlet line, said die plate employs a 12-inch diameter die plate, said funnel has a diameter of about 15.5 inches, and is openly associated with said die plate face permitting about 0.5 inch clearance.

22. The process according to claim 16 wherein said air input is at a rate of about 5000 cubic feet per minute at a temperature of about 146° F. by means of a 6-inch inlet line, said die plate employs a 12-inch diameter die plate, said funnel has a diameter of about 15.5 inches, and is openly associated with said die plate face permitting about 0.5 inch clearance.

23. The process according to claim 15 wherein said polymer is a copolymer and is a 75/25 block copolymer of butadiene and styrene.

24. The process according to claim 23 wherein said air input is at a rate of about 5000 cubic feet per minute at a temperature of about 146° F. by means of a 6-inch inlet line, said die plate employs a 12-inch diameter die plate, said funnel has a diameter of about 15.5 inches, and is openly associated with said die plate face permitting about 0.5 inch clearance.

25. A process for drying water-wet rubber comprising:

extruding said water-wet rubber through an extruder, thereby heating said rubber, passing said heated rubber through a die plate with an inlet side, a discharge side, and multiple orifices therethrough, said die plate suitable for extruding said water-wet rubber, said heated rubber discharge vaporizing a substantial portion of said water leaving a partially dried rubber, discharging said extruded rubber into funnel receiver means having a large open end and a truncated smaller end, said large open end space positioned close to and closely surrounding said die plate discharge side, said truncated small end sealably connected to a funnel discharge means, wherein said funnel discharge means is selected from one of a truncated cone and a conoid, wherein a closed chamber surrounds said discharge side of said die plate and said receiver means, said chamber having a front portion at the die plate and a rear portion at an opposite end of the chamber therefrom, and further containing an outlet sealably surrounding said funnel discharge means and inlet means for air wherein said air inlet means are positioned for tangential inlet of said air to the rear of said chamber generally parallel to and and away from said die plate face and effective to create an air vortex across said die plate face upon inlet of air stream, wherein a flow of air creates a vortex across said discharge side, sweeping said discharging rubber into said funnel receiver means while keeping said discharge side substantially free of deposits, said air sweep conveying said partially dried rubber into and through said receiver means to rubber collector means.

26. A process for drying water-wet rubber comprising:

extruding said water-wet rubber through an extruder, thereby heating said rubber, passing said heated rubber through a die plate with an inlet side, a discharge side, and multiple orifices therethrough said die plate suitable for extruding said water-wet rubber, said heated rubber discharge vaporizing a substantial portion of said water leaving a partially dried rubber, discharging said extruded rubber into funnel receiver means having a large open end and a truncated smaller end, said large open end positioned so as to be spaced slightly away from and closely surrounding said die plate discharge side, said truncated small end sealably connected to a funnel discharge means, wherein said funnel discharge means is selected from one of a truncated cone and a conoid, wherein a closed chamber surrounds said discharge side of said die plate and said receiver means, said chamber having a front portion at the die plate and a rear portion at an opposite end of the chamber therefrom, and further containing an outlet sealably surrounding said funnel discharge means and inlet means for air wherein said air inlet means are positioned for tangential inlet of said air to the rear of said chamber generally parallel to and and away from said die plate face and effective to create an air vortex across said die plate face upon inlet of air stream, wherein a flow of air creates a vortex across said discharge side, sweeping said discharging rubber into said funnel receiver means while keeping said discharge side substantially free of deposits, said air sweep conveying said partially dried rubber into and through said receiver means to rubber collector means, wherein said collector means comprise a conveying tube, and a first cyclone recovery means.

27. A process for drying water-wet rubber comprising:

extruding said water-wet rubber through an extruder, thereby heating said rubber, passing said heated rubber through a die plate with an inlet side, a discharge side, and multiple orifices therethrough said die plate suitable for extruding said water-wet rubber, said heated rubber discharge vaporizing a substantial portion of said water leaving a partially dried rubber, discharging said extruded rubber into funnel receiver means having a large open end and a truncated smaller end, said large open end spaced slightly away from and closely surrounding said die plate discharge side defining a narrow flow passage between said discharge side and said open end, said truncated small end sealably connected to a funnel discharge means, wherein said funnel discharge means is selected from one of a truncated cone and a conoid, wherein a closed chamber surrounds said discharge side of said die plate and said receiver means, said chamber having a front portion at the die plate and a rear portion at an opposite end of the chamber therefrom, and further containing an outlet sealably surrounding said funnel discharge means and inlet means for air wherein said air inlet means are positioned for tangential inlet of said air to the rear of said chamber generally parallel to and and away from said die plate face and effective to create an air vortex across said die plate face upon inlet of air stream, wherein a flow of air creates a vortex across said discharge side, sweeping said discharging rubber into said funnel receiver means while keeping said discharge side substantially free of deposits, said air sweep conveying said partially dried rubber into and through said receiver means to rubber collector means, wherein said collecting means comprise in sequence said first cyclone recovery means, a grinder means, a second cyclone recovery means, and conveying means from said grinder means to said second cyclone means.

28. A process according to any of claims 25, 26, or 27, employing said air at an input pressure of about 2 to 4 psig.

* * * * *

UNITED STATES PATENT AND TRADEMARK OFFICE
CERTIFICATE OF CORRECTION

PATENT NO. : 4,455,761

DATED : June 26, 1984

INVENTOR(S) : Robert D. Terhune et al.

It is certified that error appears in the above-identified patent and that said Letters Patent is hereby corrected as shown below:

Column 13, line 67, claim 20, line 1, "17" should read -- 15 --.

Signed and Sealed this

Twelfth Day of February 1985

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO. : 4,455,761

DATED : June 26, 1984

INVENTOR(S) : Robert D. Terhune, George L. Bazin II, James H. Long, and Linh V. Nguyen It is certified that error appears in the above-identified patent and that said Letters Patent are hereby corrected as shown below:

On the title page;

Assignee should be listed on face of Patent as:

--- Assignee: Phillips Petroleum Company

Column 13, line 67, claim 20, line 1, "17" should be

--- 15 ---.

Signed and Sealed this

Thirtieth Day of July 1985

[SEAL]

*Attest:*

DONALD J. QUIGG

*Attesting Officer*  *Acting Commissioner of Patents and Trademarks*